United States Patent Office 3,538,746
Patented Nov. 10, 1970

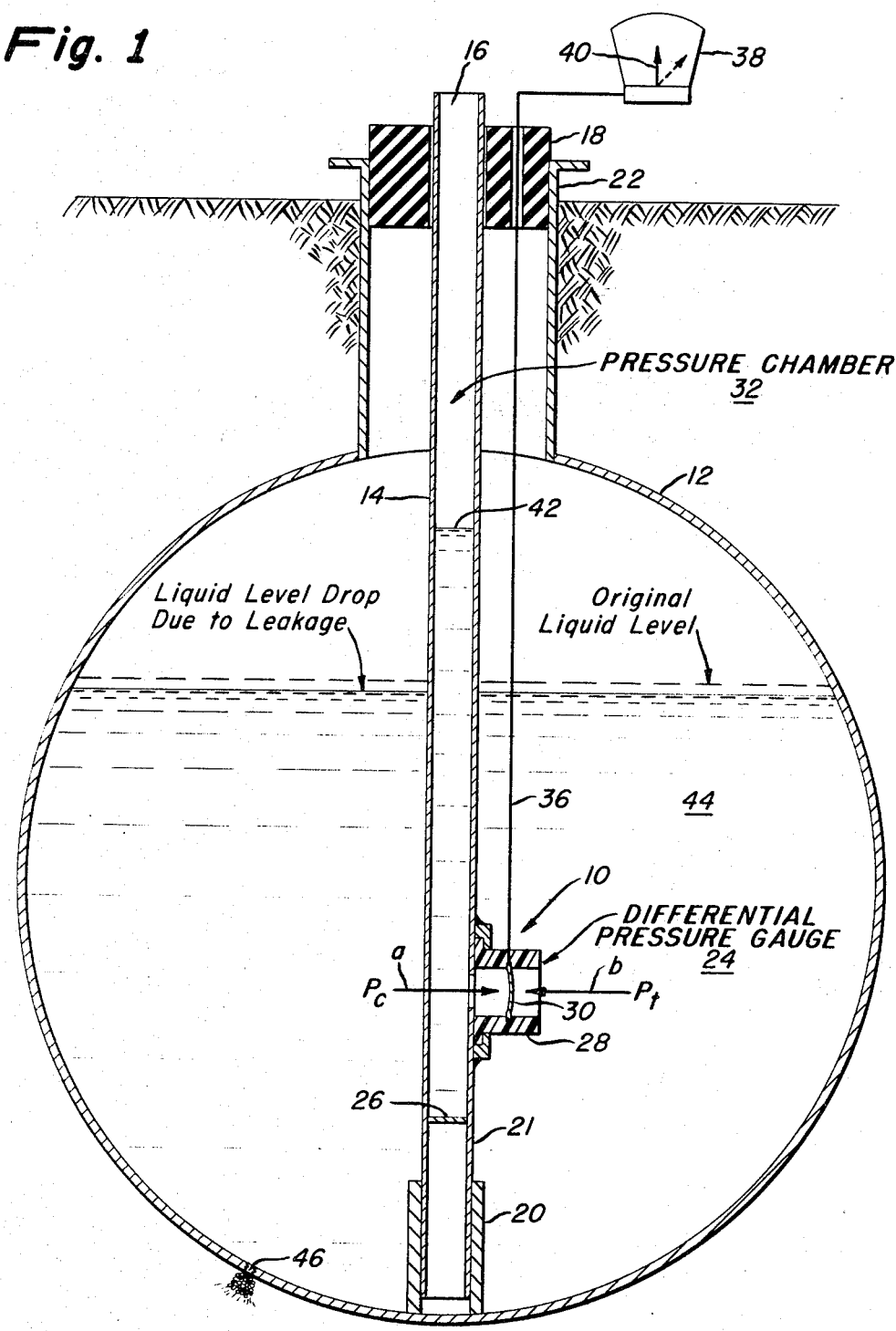

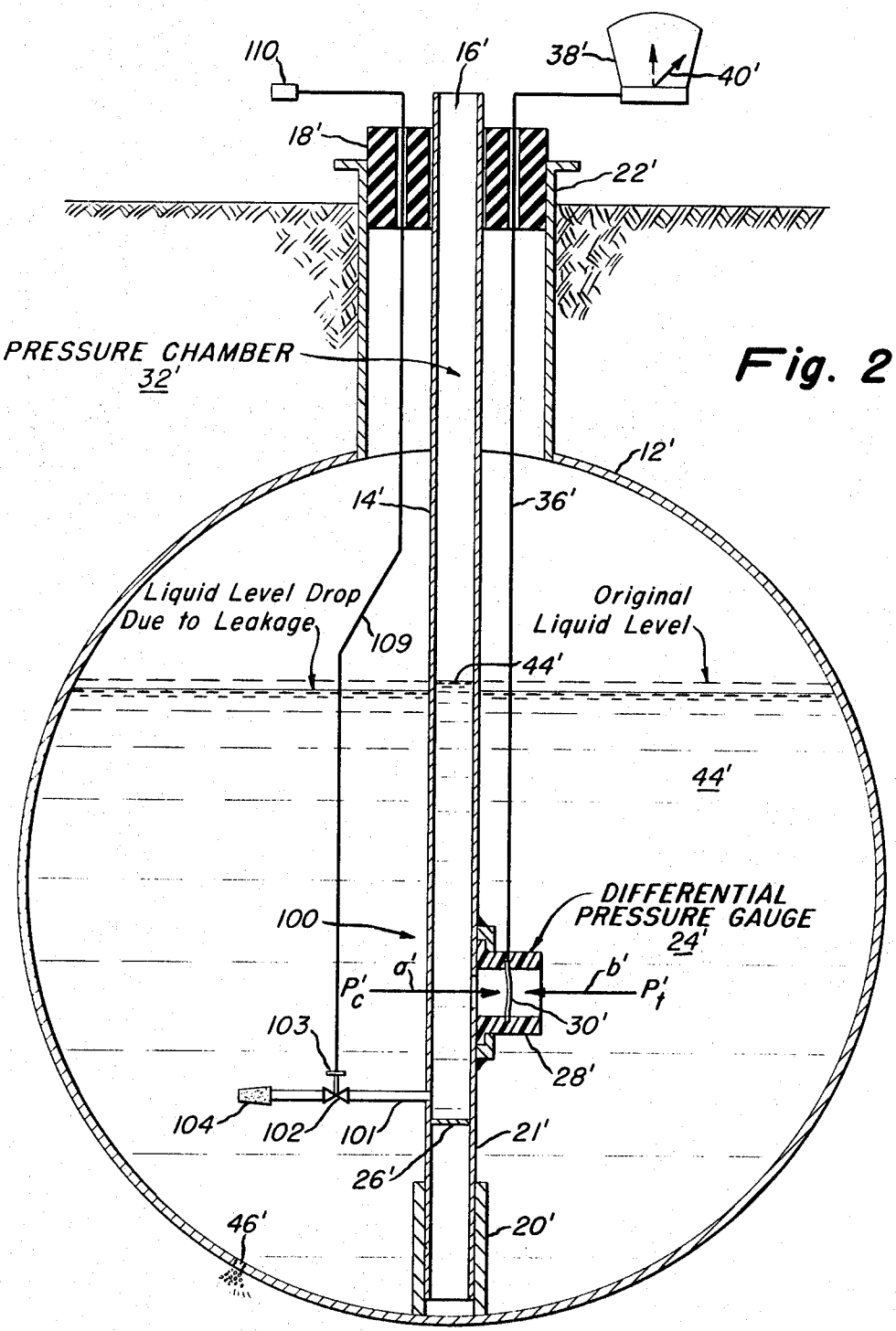

3,538,746
LEAK DETECTING METHOD AND APPARATUS
Robert B. Jacobs and Sixt Frederick Kapff, Homewood, and Irwin Ginsburgh, Morton Grove, Ill., assignors to Standard Oil Company, Chicago, Ill., a corporation of Indiana
Filed Oct. 31, 1968, Ser. No. 772,274
Int. Cl. G01m 3/00
U.S. Cl. 73—49.2                  10 Claims

ABSTRACT OF THE DISCLOSURE

This invention concerns a method and apparatus for detecting whether means containing fluid leaks. The method comprises the steps of inserting into the containing means a chamber in which a reference pressure is maintained, sensing the difference between the reference pressure within the chamber and the pressure within the containing means, and then providing, whenever said difference changes, a signal to indicate that the containing means leaks. The apparatus comprises (a) an elongated, hollow, tubular member having an open end and a closed end, and (b) a differential pressure gauge attached to said member in a manner enabling the gauge to simultaneously sense the pressure within the interior of the member and the pressure exterior to said member. Filling the interior of the member with a liquid establishes therein a reference pressure.

BACKGROUND OF THE INVENTION

Undetected slow leakage of gasoline from rusted-out or punctured storage tanks is a serious fire hazard, and present methods for detecting such tank leakage are complicated and unreliable. For example, the American Petroleum Institute method for detecting underground gasoline storage tank leakage requires: (a) filling the tank completely with gasoline, (b) attaching a calibrated, transparent tube to the flange of the tank's fill pipe, (c) adding more gasoline to the tank in order to bring the liquid level up into the tube, (d) stirring the gasoline in the tank to said in maintaining a uniform temperature throughout the gasoline, and (e) watching the liquid level in the tube to see if it changes over a period of time—a drop in liquid level normally indicates that the tank leaks.

This method must take into account changes in temperature and tank bulging. Hence, it is necessary to continually monitor temperature during the test period to the nearest 0.01° F., and if temperature changes, to make allowances for this. Moreover, due to the increased pressure of a full load, the tank's ends gradually bulge. Consequently, the liquid level in the tube drops and the tank appears to be leaking. Again allowances must be made. These allowances can only be made by a qualified expert capable of interpreting test results, and even then, there is often doubt about the validity of the test for very small leaks.

BRIEF DESCRIPTION OF THE INVENTION

We have invented a method and apparatus which detects leakage in storage tanks. Our invention overcomes the problems previously encountered in attempting to detect such leaks. For example, the tank need not be filled to capacity, thus there is no additional bulging, and changes in temperature during the test period need not be considered because they have no bearing on test results. Our method and apparatus can be used to test for leaks in either underground or above ground storage tanks, regardless of whether these tanks store liquid or gases; however, we envision that our invention will find its greatest application in detecting leaks in tanks containing liquids, particularly underground gasoline storage tanks.

Our method comprises the steps of (a) inserting into the storage tank a chamber in which a reference pressure is maintained, (b) sensing the difference between the reference pressure within the chamber and the pressure within the tank, and (c) providing a signal to indicate leaks whenever this difference changes. When testing for leaks in a storage tank containing liquid, the chamber is preferably filled at least partially with a liquid and then inserted into the tank. Filling the chamber with liquid is a simple way of establishing a reference pressure within the chamber, but gas pressure could also be used. The liquid need not necessarily be the same as the liquid stored in the tank, nor does the chamber have to be filled with liquid before it is inserted into the tank if the chamber can be filled after it has been inserted into the tank. In the tank, at a common point beneath the surface of the liquid stored in the tank, the pressure at that point exerted by the liquid in the tank is compared with the pressure at that point exerted by the liquid in the chamber. Any differential between the tank pressure and the chamber pressure at this point is noted. Initially the differential in pressure may be zero. This means the tank and chamber pressures at the common point of measurement are exactly equal. Since liquid cannot leak into or from the chamber, the pressure exerted by the liquid in the chamber at the common point of measurement remains constant. On the other hand, the pressure exerted by the liquid in the tank on this common point will vary if the tank leaks. The differential between these pressures is then observed over a suitable interval, and if the differential changes, this indicates that the tank is leaking.

Our leak detecting apparatus has three principal components: a pressure chamber in which a constant reference pressure is maintained, a differential pressure gauge which senses whenever the differential in pressure between the reference pressure and the pressure in the tank changes, and means activated by the gauge whenever said differential changes which provide a signal indicating leaking.

There are two preferred embodiments of the apparatus of our invention. Each is particularly adapted to be used in detecting leaks in tanks storing liquids, although they are not limited to this use, and each has a chamber which is filled with liquid and a differential pressure gauge connected to the chamber in a manner which enables the gauge to simultaneously sense the pressure exerted by the liquid within the chamber and the pressure exerted by the liquid in the tank. When either of these apparatus is inserted into the tank, the gauge is submersed below the level of the liquid in the tank. The gauge responds to the pressure exerted by the liquid in the chamber and the pressure exerted by the liquid in the tank to actuate a meter coupled to it. The meter provides a signal indicating what the difference between these pressures is, and if the reading of the meter varies over a period of time, then the tank is leaking.

In both embodiments of the apparatus the chamber is preferably made of a material which has virtually a zero coefficient of expansion at normal ambient temperatures. One such preferred material is a metal alloy made principally of iron and nickel. The nickel constitutes about 36 weight percent of the alloy, and the iron constitutes about 64 weight percent of the alloy, but minor amounts of other ingredients are also used. This alloy, which is sold by the Carpenter Steel Corporation under the trade name Invar, does not expand noticeably over a temperature ranging between about 0° F. and about 200° F.

When the chamber is made of Invar or the like, and the chamber is filled with the same liquid as is contained in the tank being tested, changes in temperatures will have no bearing on the operation of the leak detecting apparatus of our invention. In this instance, both inside and outside the chamber, changes in ambient temperatures cause the liquid to change in volume by the same proportionate amount. Consequently, if the tank is not leaking, the liquid levels in the tank and chamber remain in the same position relative to each other so long as the chamber does not change volume with changes in temperature. If the chamber did change in volume with changes in temperature, the liquid level in the chamber would change relative to the liquid level in the tank, and the differential in pressure would then vary, indicating that the tank leaks even through the tank, in fact, is not leaking. Thus, when the chamber is made of a material which has virtually a zero coefficient of expansion at normal ambient temperatures, false leak detections are avoided. However, it may be possible in some instances to conduct the test at constant temperatures. Then the chamber need not be made of Invar or the like, nor does it need be filled with the same liquid that is in the tank.

The two preferred embodiments differ mostly in the means of introducing liquid into the chamber. In one embodiment, the chamber has an open end which extends from the tank when the apparatus is inserted into the tank enabling liquid to be fed into the open end. In the other embodiment, the chamber has connected to it a valve which is operable between open and closed positions. With the apparatus inserted into the tank and the valve open, liquid rushes into the chamber, filling it. The valve is equipped with means for opening and closing it while the apparatus is inside the chamber, and desirably, it is also equipped with a filter that removes any dirt from the liquid before the liquid enters the chamber.

BRIEF DESCRIPTION OF THE DRAWINGS

FIG. 1 is a schematic drawing illustrating using one embodiment of our apparatus to test for leaks in an underground storage tank.

FIG. 2 is a schematic drawing using another embodiment of our apparatus to test for leaks in an underground storage tank.

DESCRIPTION OF THE PREFERRED EMBODIMENTS

As shown in FIG. 1, leak detecting apparatus 10 is adapted to be conveninetly inserted into underground storage tank 12, containing liquid 44 which is at a constant, uniform temperature. Apparatus 10 includes an elongated, hollow, tubular member 14 made of Invar and having an upper open end 16. Open end 16 extends through a passageway in stopper 18, which is stuffed into the mouth of the tank's fill pipe 22, and magnet 20, which is secured to submerged end 21 of member 14, attaches itself to the inside of tank 12. Thus apparatus 10 is held stationary during testing. A conventional differential pressure gauge 24, such as the Baratron meter sold by MKS Instruments, Inc., of Burlington, Mass., is also attached to submerged end 21. Gauge 24 includes an annular bearing piece 8 made of insulating material and flexible diaphragm 30 mounted within the opening of the annular bearing piece. Piece 28 is securely mounted to member 14, and plate 26 welded to the inside of member 14 closes end 21 to define, along with member 14 and diaphragm 30, pressure chamber 32. Conductor 36 wrapped in a suitable insulating material electrically connects diaphragm 30 to meter 38. Diaphragm 30, which is one component in an electrical circuit (not shown) that controls the position of the meter's pointer 40, flexes in accordance with the different pressures applied to it, and is thus strained. The position of pointer 40 is governed by this strain, and changes whenever the pressures acting on diaphragm 30 change.

In operation, the person conducting the test pours liquid 42 through opening 16, filling chamber 32 with enough of the liquid so that pointer 40 appears on the scale of meter 38. Liquid 42 is at the same temperature as liquid 44. Pressure $P_c$ exerted by liquid 42 tends to push diaphragm 30 in a direction indicated by arrow $a$. Liquid 44 in tank 12 also exerts a pressure $P_t$ against diaphragm 30, and tends to push it in the opposite direction indicated by arrow $b$. This places a strain on diaphragm 30 which is proportional to the difference between pressure $P_c$ exerted by liquid 42 and pressure $P_t$ extered by liquid 44 at the common point of measurement, diaphragm 30. Since the strain on diaphragm 30 controls the position of pointer 40, as long as pressures $P_c$ and $P_t$ exerted on diaphragm 30 do not change, pointer 40 does not move. But tank 12 has hole 46 in it, and liquid 44 seeps out of this hole. Consequently, the level of liquid 44 in tank 12 drops, pressure $P_t$ exerted by liquid 44 against diaphragm 30 changes, and pointer 40 moves. The original liquid level and the original position of pointer 40 are indicated in dotted lines. As the liquid level in tank 12 gradually drops to the level indicated in solid lines, pointer 40 moves to the position indicated in solid lines. The movement indicates leakage, and the direction pointer 40 moves; indicates whether liquid is seeping from or into tank 12.

The other embodiment shown in FIG. 2, apparatus 100, is similar to apparatus 10, and the elements of apparatus 100 which are equivalent to the elements of apparatus 10 are given the same numbers and a prime designation ('). In addition to these common elements, apparatus 100 includes tube 101, valve 102 attached to an intermediate portion of the tube, and filter 104 fitted to the head of the tube. Valve 102 operates like a stopcock so that when it is opened and closed liquid 44' is not displaced from chamber 32'. Valve 102 is actuated by pneumatic conveyor 103, with operating pressure being supplied through nose 109, and control 110 governing the pressure supplied therethrough. When the valve 102 is opened, liquid 44' flows through tube 101 into chamber 32', and filter 104 entraps any dirt particles before the liquid enters the chamber.

In operation, the person conducting the test merely operates control 110 to open valve 102. Liquid 44', which need not be at a constant uniform temperature, rushes into chamber 32' until the liquid level in the chamber equals the liquid level in tank 12'. Valve 102 is then closed. Initially pressure $P_c'$ exterted on diaphragm 30' by liquid 44' in chamber 32' equals pressure $P_t'$ exerted by liquid 44' in tank 12'. But tank 12' has hole 46' therein, which permit liquid 44' to escape therefrom. Consequently, pressure $P_t'$ is reduced as liquid seeps through hole 46' and the liquid level in tank 12' drops. Diaphragm 30' responds, and pointer 40' of meter 38' moves. The original liquid level and the original pointer position are shown in dotted lines. As the liquid level in the tank 12' drops to the level indicated in solid lines, pointer 40' moves to the position indicated in solid lines. Again, the movement of pointer 40' indicates leakage, and the direction the pointer moves indicates whether liquid is seeping from or into tank 12'

The above description has been presented merely to illustrate the preferred embodiments of our invention. It will be apparent to those skilled in the art that many changes in our method and apparatus can be made which do not depart from the basic principles disclosed herein. For example, our apparatus may have to be modified so it can be fit into tanks of different geometrical configurations or tanks containing gas.

We claim:

1. A method for detecting whether a tank containing liquid leaks, comprising the steps of:

(a) inserting into the tank a chamber adapted to receive liquid;

(b) filling the chamber at least partially with liquid either before the chamber is inserted into the tank or after it has been inserted into the tank;

(c) sensing at a common point beneath the liquid level within the tank the differential in pressure exerted by the liquid in the chamber and the liquid in the tank; and (d) detecting any change in differential in pressure, whereby a change in said differential in pressure indicates that the tank is leaking.

2. Apparatus for detecting whether means containing liquid leaks, comprising:

(a) pressure chamber means in which a reference pressure is maintained;

(b) means coupled to the chamber means which sense at a common point beneath the liquid level within the containing means the differential in pressure between the reference pressure in the chamber means and the pressure of the liquid in the containing means; and (c) means which are actuated by the differential pressure sensing means whenever said differential in pressure changes to provide a signal indicating leaking.

3. Apparatus defined in claim 2 wherein the chamber means is made of material having virtually a zero coefficient of expansion at normal ambient temperatures, whereby the volume of the chamber means remains constant in spite of temperature fluctuations.

4. Apparatus defined in claim 3 wherein said temperature range is from about 0° F. to about 200° F.

5. Apparatus for detecting whether a tank containing a liquid leaks, comprising:

(a) a chamber which receives liquid and is made of a material having virtually a zero coefficient of expansion at normal ambient temperatures;

(b) means for introducing liquid into said chamber so that a reference pressure is established within said chamber;

(c) differential pressure gauge means coupled to the chamber which sense at a common point beneath the liquid level within the tank the differential in pressure between the reference pressure in the chamber and the pressure of the liquid in the tank; and (d) meter means which are connected to the pressure gauge means and which are actuated by said pressure gauge means to provide a signal indicating leakage whenever said differential in pressure changes.

6. Apparatus defined in claim 5 wherein said introducing means comprises an opening in the chamber above the liquid level in the tank through which liquid may be fed.

7. Apparatus defined in claim 5 wherein said introducing means comprises valve means coupled to the chamber and operable between an open and closed position, said valve means in the open position placing the chamber in communication with the liquid in the tank so that the chamber is filled at least partially with said liquid.

8. Apparatus defined in claim 7 wherein said valve means is provided with means for opening and closing said valve means while said apparatus is inside said tank.

9. Apparatus defined in claim 8 wherein said valve means is provided with filter means for filtering the liquid as it flows into said chamber.

10. Apparatus defined in claim 8 including means for holding said apparatus in a stationary position while said apparatus is inside the chamber.

References Cited

UNITED STATES PATENTS

| | | | |
|---|---|---|---|
| 2,651,938 | 5/1950 | Heigl | 73—290 |
| 3,257,851 | 6/1966 | Altman et al. | 73—299 |
| 3,460,386 | 8/1969 | Guignard | 73—290 |

LOUIS R. PRINCE, Primary Examiner

W. A. HENRY, Assistant Examiner

U.S. Cl. X.R.

73—299